US007213798B1

(12) United States Patent
Thompson et al.

(10) Patent No.: US 7,213,798 B1
(45) Date of Patent: May 8, 2007

(54) METHOD AND APPARATUS FOR RETRIEVING SUBMERGED VEHICLES

(76) Inventors: Gary Thompson, 28300 Little Floyd Lake Rd., Detroit Lakes, MN (US) 56501; Jim Granger, 344 Elizabeth St., Detroit Lakes, MN (US) 56501

( * ) Notice: Subject to any disclaimer, the term of this patent is extended or adjusted under 35 U.S.C. 154(b) by 0 days.

(21) Appl. No.: 10/360,466

(22) Filed: Feb. 6, 2003

(51) Int. Cl.
*B66D 1/00* (2006.01)
*E01D 1/00* (2006.01)
*B60P 3/10* (2006.01)

(52) U.S. Cl. ....................... 254/323; 254/266; 14/71.1; 114/344; 114/352

(58) Field of Classification Search ................ 254/323, 254/266; 14/71.1, 71.3; 114/344, 345, 352, 114/353, 354, 244
See application file for complete search history.

(56) References Cited

U.S. PATENT DOCUMENTS 4,079,953 A 3/1978 Howarth, Jr. ................ 280/19
4,286,346 A * 9/1981 Wiek .......................... 114/344
4,470,746 A * 9/1984 Delachapelle ............... 414/470
4,813,841 A * 3/1989 Eischen ...................... 414/477
5,683,130 A 11/1997 Pheifer ...................... 294/66.1
6,120,234 A * 9/2000 Dinverno .................... 414/538
6,182,595 B1 * 2/2001 Morris ....................... 114/259
6,602,022 B1 * 8/2003 Wilkins ......................... 405/3
6,923,132 B1 * 8/2005 McKenzie ................... 114/44
2002/0078876 A1 * 6/2002 Ockels ....................... 114/344
2002/0164239 A1 * 11/2002 Angermeier ................ 414/480
2003/0101920 A1 * 6/2003 Foxwell ...................... 114/344

* cited by examiner

*Primary Examiner*—Emmanuel Marcelo
*Assistant Examiner*—Evan Langdon
(74) *Attorney, Agent, or Firm*—Curtis Harr

(57) ABSTRACT

A submerged vehicle extraction method employing a specifically designed apparatus known as the submerged vehicle extractor. The primary purpose of the submerged vehicle extractor is to facilitate the transferring of a vehicle that has broken through the frozen surface of a body of water from the water to the solid upper surface of the ice during the vehicle recovery process. This is done through the use of an elongate frame having a center pivot point and a winch. The sunken vehicle engages the extractor through the use of the winch and is then moved from the water to ice level via the extractors teeter totter type movement. Additionally, the use of the present invention also minimizes the stresses placed on the vehicle during the extraction process as the entire weight of the vehicle in this stressful operation is carried by the present invention through the frame of the vehicle.

13 Claims, 6 Drawing Sheets

FIG 3
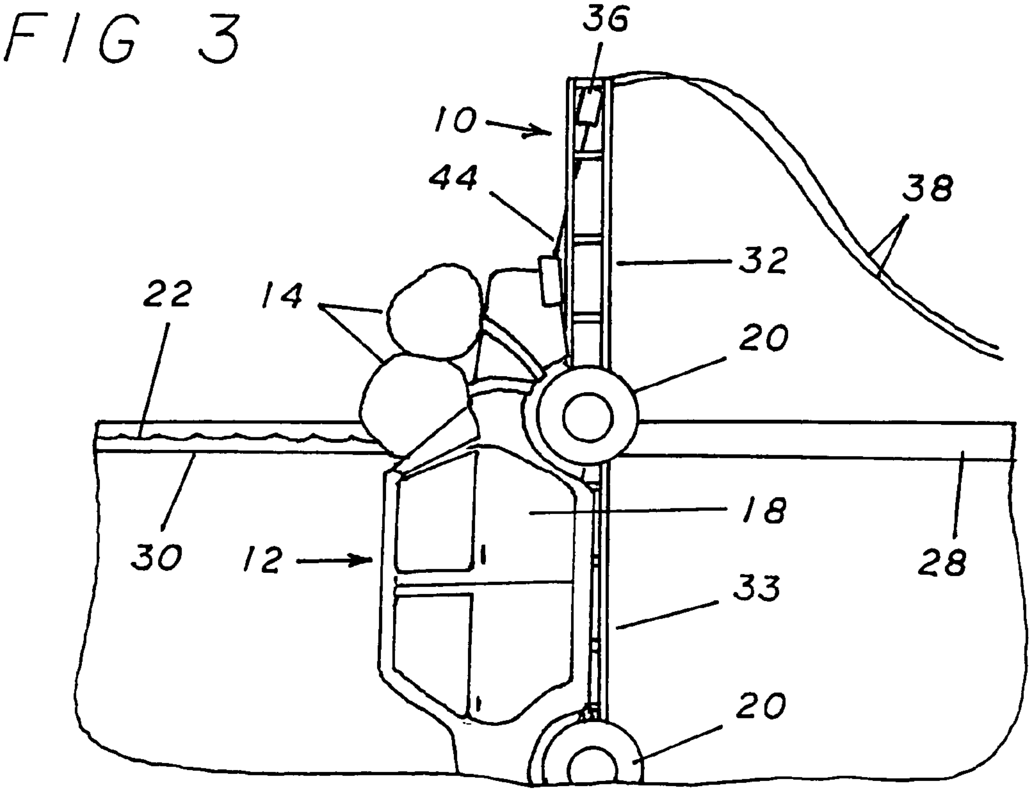
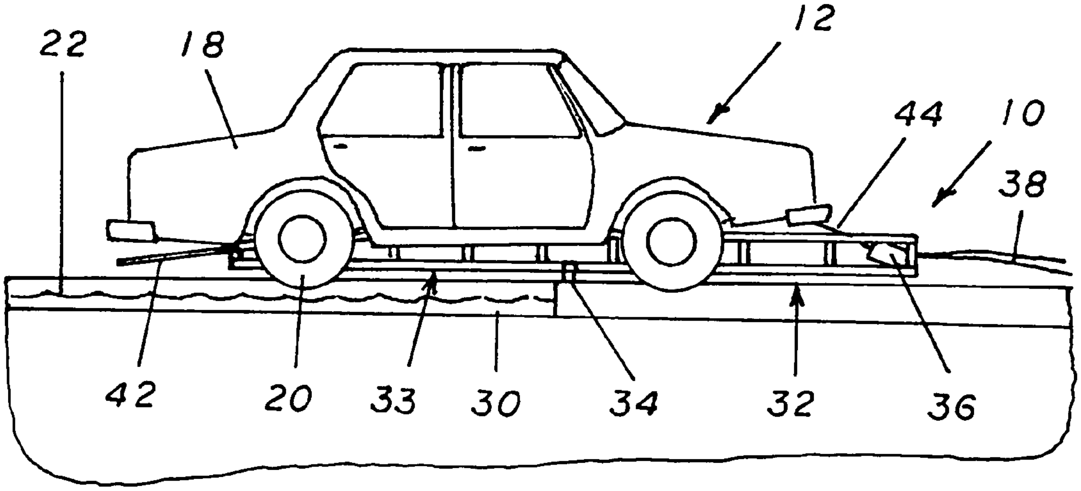
FIG 4

FIG 5
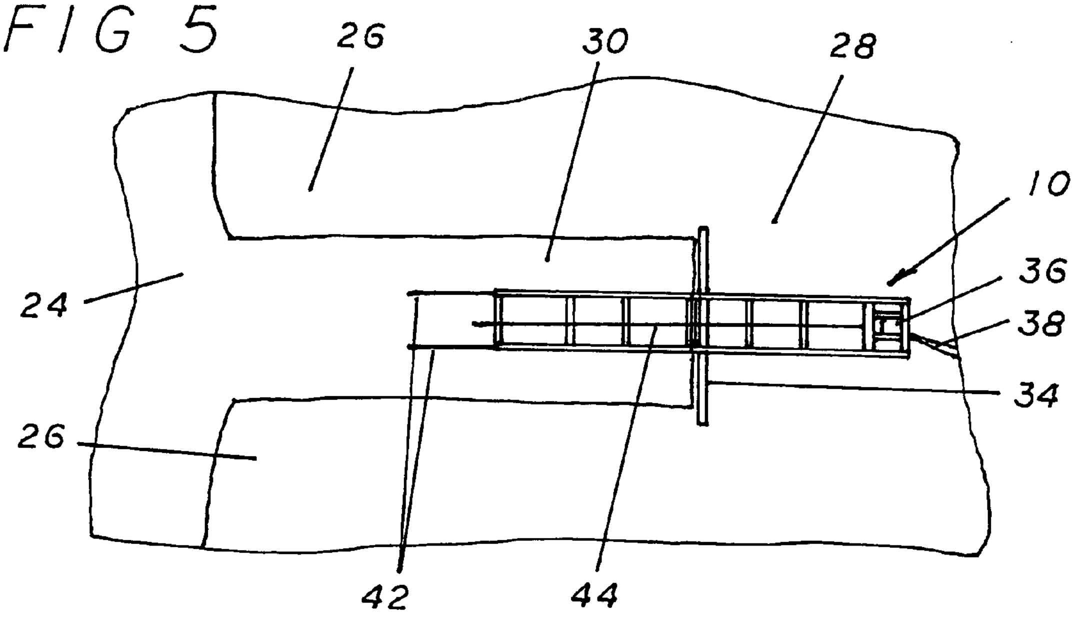
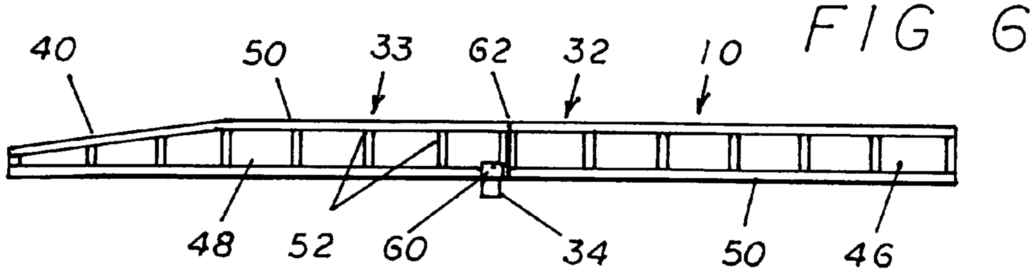
FIG 6
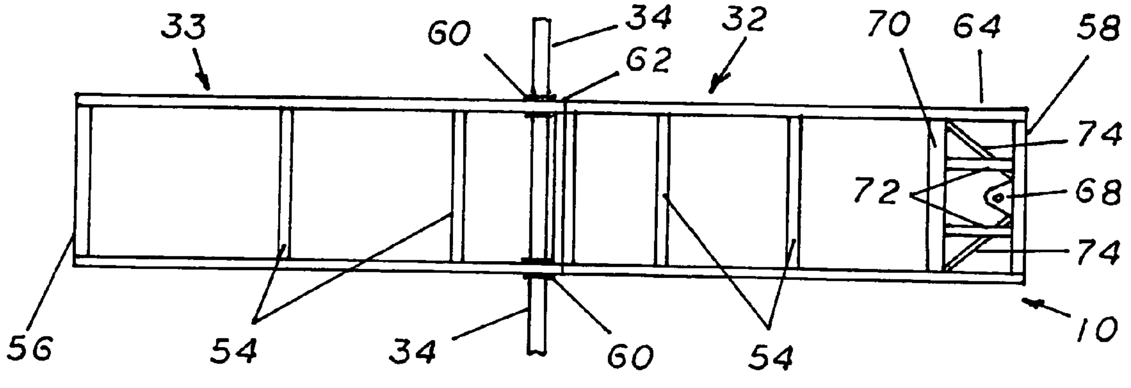
FIG 7

FIG 8
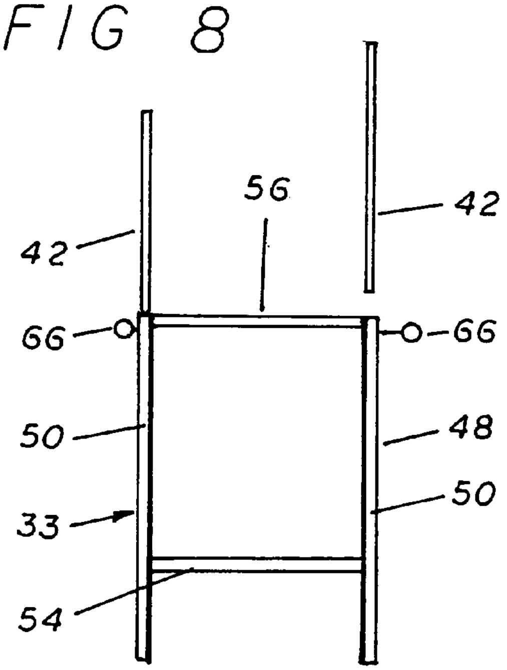
FIG 9
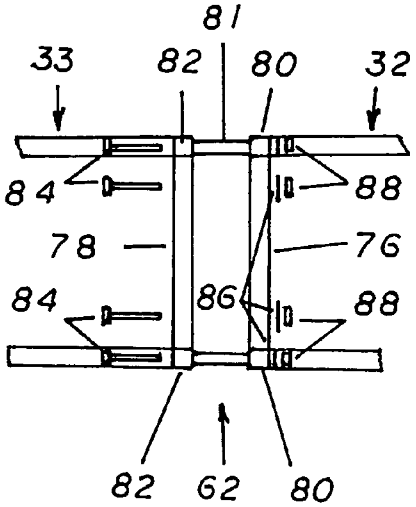
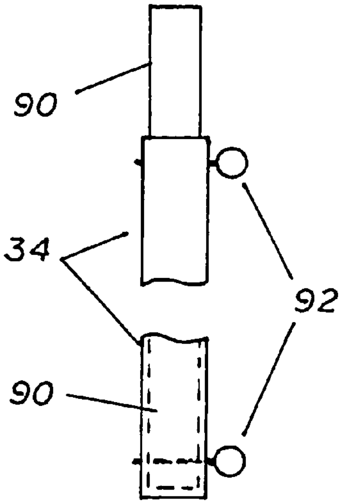
FIG 10
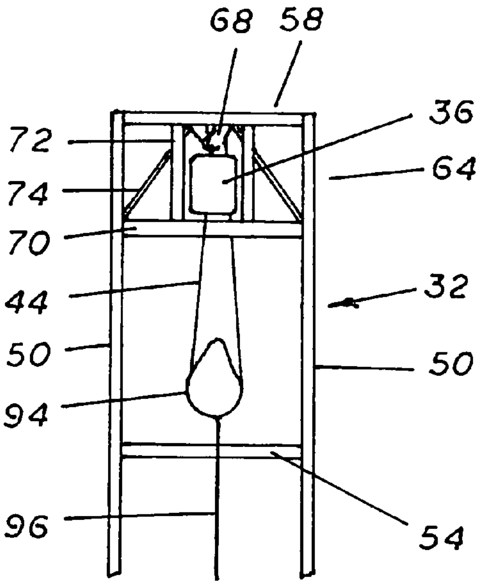
FIG 11

FIG 12
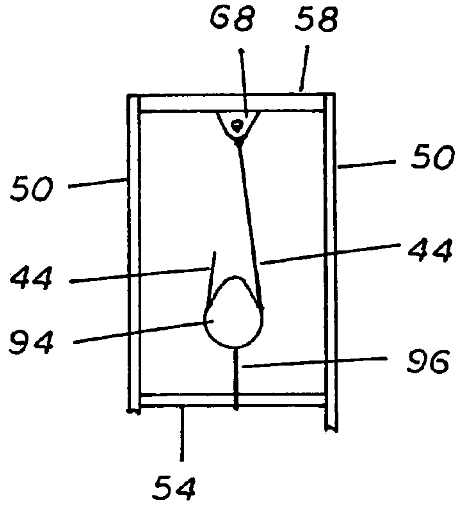
FIG 13
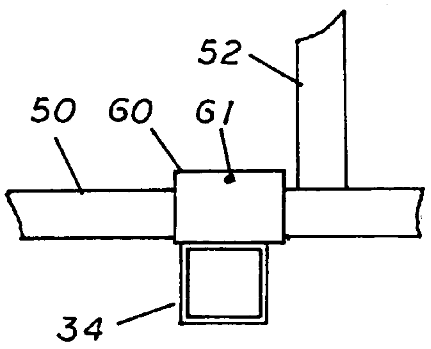
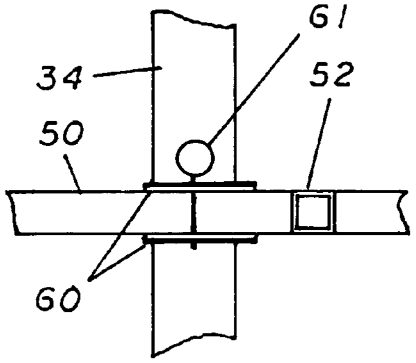
FIG 14
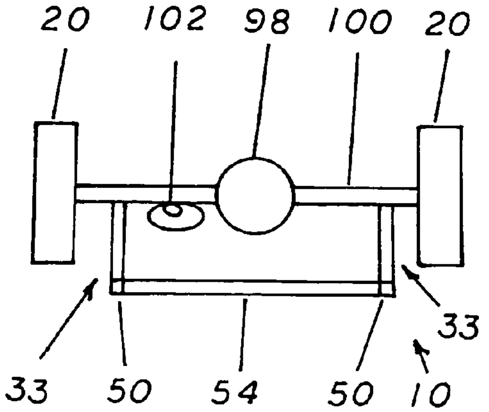
FIG 15

METHOD AND APPARATUS FOR RETRIEVING SUBMERGED VEHICLES

BACKGROUND OF THE INVENTION

The present invention relates to an improvement in the methods used to recover automobiles or other vehicles that have become submerged in a body of water. More specifically, to a method of retrieving such vehicles that have become submerged after breaking through the frozen surface of a body of water during the winter months.

As the popularity of winter sports grows throughout the northern hemisphere, more and more people are venturing out onto the frozen surfaces of lakes and rivers for the purposes of ice fishing, snowmobiling or any number of other outdoor winter activities. The inevitable result of this increase in activity is the increase in the frequency that these people and their vehicles encounter dangerously thin ice conditions. The increases in these encounters are either a result of a person's ignorance of the existing ice conditions or their complacency in assessing the risks present. These actions not only place the lives of the people involved at risk, but often result in the vehicle in question ending up on the bottom of the lake or river with the owner having no easy or inexpensive manner of returning it to the surface.

The problems associated with being the owner of a vehicle that has become accidentally submerged in a body of water are exacerbated by the fact that the relevant governmental body often requires that the owners remove them within a specified amount of time. If the owner fails to do so, the government will take on the responsibility of removing the vehicle and pass their incurred costs (which often significantly exceed the costs charged to private persons) to the owner of the vehicle. Additionally, the relevant governmental body will also typically add a significant amount of fines and fees to the final removal bill and in some circumstances, the owners of these vehicles may be subject to criminal penalties. Therefore, to those persons who are unfortunate enough to own a vehicle that has fallen through the ice, a quick and cost effective retrieval of the vehicle is in their best interest.

In the past, the methods employed to retrieve these vehicles has varied greatly. The most commonly employed method generally included the use of a large steel A-frame apparatus that was set up on the surface of the ice somewhere above the submerged vehicle. A cable and winch system was then employed to pull the vehicle to the surface and out of the body of water. While this system was effective in retrieving the submerged vehicle, the problems associated with its use were numerous. The first of these is the overall weight and complexity of the A-frame apparatus made it difficult to move around and set up requiring a relatively large support staff to accomplish. The weight of the apparatus and the large required crew also made it relatively dangerous as it was more likely to break through the ice and end up on the bottom itself. Finally, the complexity of the apparatus and the required use of a relatively large amount of workers in the support crew also increase the total man hours required to complete a vehicle recovery which in turn adds to the final costs bore by the vehicles owner.

Therefore, it can be seen that it would be advantageous to provide a method of retrieving vehicles that have become submerged in a lake or river (most commonly by falling through a dangerously thin layer of winter ice) in a timely manner that requires minimal support staff and man hours to complete. Additionally, it can be seen that it would be advantageous to provide such a recovery method that is light in its overall weight and simple in its operations which in turn lessens the number of workers required to move it around and to position and operate it properly. It can also be seen that the resulting reductions in weight contributes to the overall safety of the retrieval method as it limits the amount of additional weight placed on the surface of the ice. Finally, it can also be seen that the reduction in weight and simplification of the equipment employed in the removal of submerged vehicles will result in fewer man hours being expended which will in turn reduce the final costs incurred by the vehicle owner.

SUMMARY OF THE INVENTION

It is the primary objective of the present invention to provide a method by which a vehicle that has become submerged in a body of water can be quickly and easily recovered at a minimal cost to its owner.

It is an additional objective of the present invention to provide such a method by which a submerged vehicle can be recovered by employing a specifically designed apparatus which is both light in weight and simple in its operations.

It is a further objective of the present invention to provide such a method by which a submerged vehicle can be recovered in a safe manner which is accomplished by lessening the weight of the employed materials and the number of people and man hours involved in the recovery operation.

These objectives are accomplished by a method of submerged vehicle recovery which employs a specifically designed apparatus known as the submerged vehicle extractor. The primary purpose of the submerged vehicle extractor is to facilitate the transferring of the vehicle from the water to the solid upper surface of the ice during the recovery process. Additionally, the operation of this apparatus requires approximately three (3) workers on the ice surface to accomplish the transfer of the vehicle to the surface of the safe ice and the entire recovery process can usually be accomplished in approximately two (2) to three (3) hours. The result of the use of the method that is the subject of the present invention when compared to the previous methods employed is a reduction of the required time by more than half and a reduction of the actual man hours by more than two thirds.

The use of the present invention also minimizes the stresses placed on the vehicle during the extraction process. This is due to the fact that through its design, the actual transfer of the weight of the vehicle, during the critical point, when it is removed from the water and placed on the surface of the ice is born by the frame of the vehicle. This transfer is accomplished by the present invention's engaging the frame of the vehicle while it is still mostly submerged in the water. Once this has been done, the vehicle is winched upwards to a point where its center of gravity in the vertical plane is approximately at the mid point of the frame of the present invention. With this accomplished, the present invention is simply rotated from the vertical orientation to a horizontal one which in turn performs the same act on the vehicle thereby changing its vertical orientation within the water to a horizontal orientation on the surface of the ice. The important point in this procedure is that the entire weight of the vehicle in this stressful operation is carried by the present invention through the frame of the vehicle. This design is a significant improvement over existing methods that winch the vehicle entirely out of the water in a vertical orientation before transferring it to the surface of the ice in an unsupported manner, often resulting in unnecessary damage to the body and frame of the vehicle.

The submerged vehicle extractor is made up of a square tubed frame that forms an elongated rectangle that is U-shaped in its cross-section. The central portion of the frame is fitted with an anchor/pivot bar which serves two purposes in the extractor's operation. The first of these is to anchor the center of the extractor solidly in the proper position during its operation. The second is to provide a pivot point so that the forward end can be tilted into the water during the retrieval of the vehicle from the water. This pivoting ability of the submerged vehicle extractor is critical to the operation of the present invention as it is the feature that allows the vehicle to be transferred from the water to the surface of the ice with only a minimal amount of effort and a relatively small crew consisting of two (2) to five (5) workers.

The process of recovering a submerged vehicle is initially begun by placing a diver into the water who is to locate the vehicle and to determine its orientation and the best approach to returning it to the surface. The diver then relays the information regarding the vehicle's location to the other crew members on the surface of the ice. The surface crew members then proceed to cut a seven (7) to eight (8) foot wide channel in the ice leading from the thin ice at the vehicle's point of entry, or the edge of the ice that is closest to the vehicle, to a point at which the thickness of the ice has been determined to be of a great enough thickness to easily support the weight of the vehicle, the extractor and the crew members with ease. Once this channel has been cut, the submerged vehicle extractor is positioned at the channel head to await the positioning of the vehicle for its subsequent extraction. In rare instances, it may not be necessary to cut a channel as the ice near the vehicles point of entry is safe.

The cutting of the above described vehicle channel can be accomplished through the use of any number of cutting tools. However, this is most commonly accomplished by the use of chain saws which are either powered by gasoline engines or by hydraulic pressure. The use of hydraulic pressure for this purpose is preferable because it will operate in all types of environments including under water, clearly superior to gasoline powered versions of the same tool. The hydraulic pressure necessary to operate these types of chain saws can be supplied by a hydraulic motor attached to a portable gasoline motor hauled on a trailer employed to transport gear to the work site.

While the vehicle channel is being cut through the bad ice, the diver returns to the vehicle with a plurality of inflatable lift bags. These lift bags are positioned in the proper locations on the vehicle and inflated through a connection to a scuba cylinder with a regulator and hose attachment designed to hook up to the lift bag filler hoses. The divers then exit the water so as to avoid any danger to themselves. As the lift bags are filled with air, they rise and carry the vehicle to the surface of the body of water. The surface crew works to position the vehicle within the vehicle channel and to begin to move it through the channel towards the submerged vehicle extractor and the solid ice.

Once the vehicle has been placed in the proper location within the channel, it is manipulated to an orientation that best facilitates its removal from the water. One common example of this manipulation is moving one of the lift bags to the same end of the vehicle that the other one is located. This positioning of the lift bags results in a vehicle that is vertically oriented with respect to its front and rear ends. This vertical orientation of the vehicle is also mimicked by the submerged vehicle extractor by pivoting its body around the anchor/pivot bar located roughly at its center and on the upper surface of the terminal end of the cut vehicle channel.

Once the vehicle has been properly oriented within the water, the end of the winch cable is fixed to either the front or rear end of the vehicle, which ever is closest to the surface of the water. With the vehicle thus secured to the body of the submerged vehicle extractor through the winch and winch cable, the winch is engaged which in turn begins to draw the vehicle upward and onto the body of the submerged vehicle extractor. The upper portions of the cross-sectional U-shape that forms its body is narrower than the tire track of all road vehicles and so, as the vehicle is drawn upwards and out of the water, engages the frame of the vehicle between the tires. Thus, the body of the submerged vehicle extractor bears the weight of the vehicle in all orientations and the wheels of the car do not touch any surface until the vehicle is removed at the end of the operation of the invention. Additionally, because the recovered vehicle is only riding on the two rails of the present invention, there is less chance of any of the vehicle's protruding lower components (such as the differential or exhaust system) catching on the present invention and interfering with the extraction of the vehicle from the water.

The lifting of the vehicle continues in this manner until enough of it has been lifted above the anchor/pivot bar so that the center of the vehicle's weight is at or near the anchor/pivot bar. Once this has been accomplished, the submerged vehicle extractor and the attached vehicle can be pivoted from the vertical to the horizontal position with relative ease. With this accomplished, the vehicle is entirely free of the water and must simply be pushed off of the submerged vehicle extractor to complete the operation.

For a better understanding of the present invention reference should be made to the drawings and the description in which there are illustrated and described preferred embodiments of the present invention.

DESCRIPTION OF THE DRAWINGS

FIG. 3 is a side elevation view of the present invention illustrating the orientation of the vehicle as it is being removed from the water.

FIG. 4 is a side elevation view of the present invention illustrating the orientation of the vehicle after the submerged vehicle extractor has been pivoted to the horizontal position which in turn completely frees the vehicle from the water and places it on the ice surface.

FIG. 5 is a top elevation view of the present invention illustrating the configuration of the cut car channel and the position of the submerged vehicle extractor at its head.

FIG. 6 is a side elevation view of the body of the submerged vehicle extractor illustrating its manner of construction and the general location of the anchor/pivot bar at its center.

FIG. 7 is a top elevation view of the body of the submerged vehicle extractor illustrating its manner of construction and the general location of the anchor/pivot bar at its center and the winch mount at its rear.

FIG. 8 is a top elevation view of the most forward end of the submerged vehicle extractor illustrating it as configured with guide bars employed to guide the vehicle into the proper location during operations and the manner used to fix them to the extractor.

FIG. 9 is a top elevation view of the center components of the submerged vehicle extractor illustrating its capability of splitting its body in two for storage and transport and the manner in which the disassembly and reassembly of the body is accomplished.

FIG. 10 is a top elevation view of the anchor/pivot bar assembly of the submerged vehicle extractor illustrating its incorporation of extensions that can be employed to add a further degree of stabilization in certain adverse situations.

FIG. 11 is a top elevation view of the rearward portion of the submerged vehicle extractor illustrating the manner of construction of the winch and winch mount assembly and also detailing the use of the optional snatch block which doubles the effective lifting power of the winch.

FIG. 12 is a top elevation view of the rearward portion of the submerged vehicle extractor illustrating the configuration of the eye-hook to which the end of the winch cable is attached when a snatch block is employed.

FIG. 13 is a side elevation view of the bar pivot mount component of the submerged vehicle extractor and illustrates the manner by which the anchor/pivot bar is attached to and held in the desired position to the body of the submerged vehicle extractor.

FIG. 14 is a top elevation view of the bar pivot mount component of the submerged vehicle extractor and illustrates the manner by which the anchor/pivot bar is attached to and held in the desired position to the body of the submerged vehicle extractor.

FIG. 15 is a front elevation view of the present invention illustrating the manner in which it engages the lower components of the vehicle thereby facilitating its removal in a manner that creates the lowest possible risk of damage to it during the extraction process.

DESCRIPTION OF THE PREFERRED EMBODIMENT

Figure 1:
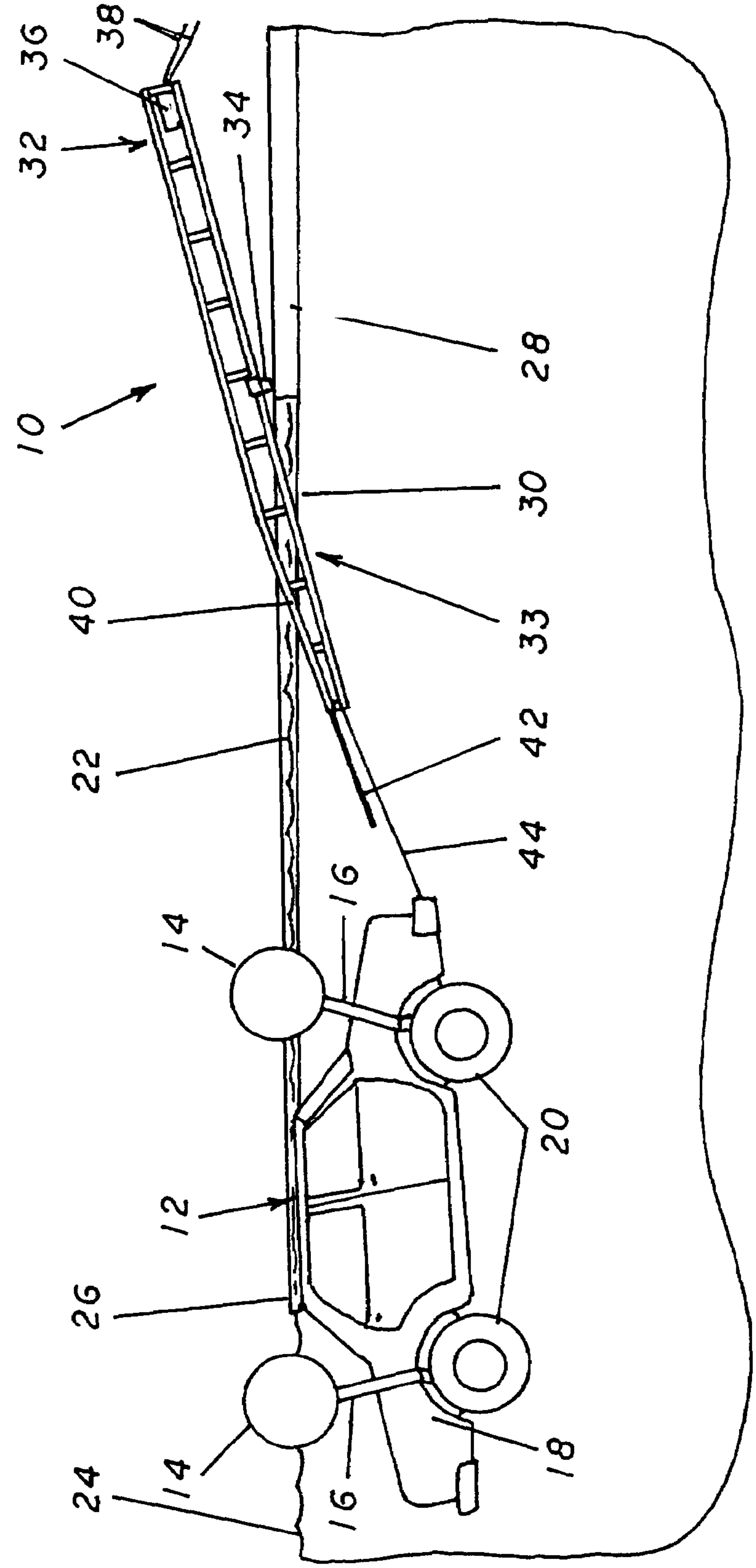
FIG. 1 is a side elevation view of the present invention which illustrates the manner in which a vehicle is floated to the surface of the water and attached to the submerged vehicle extractor.
Figure 2:
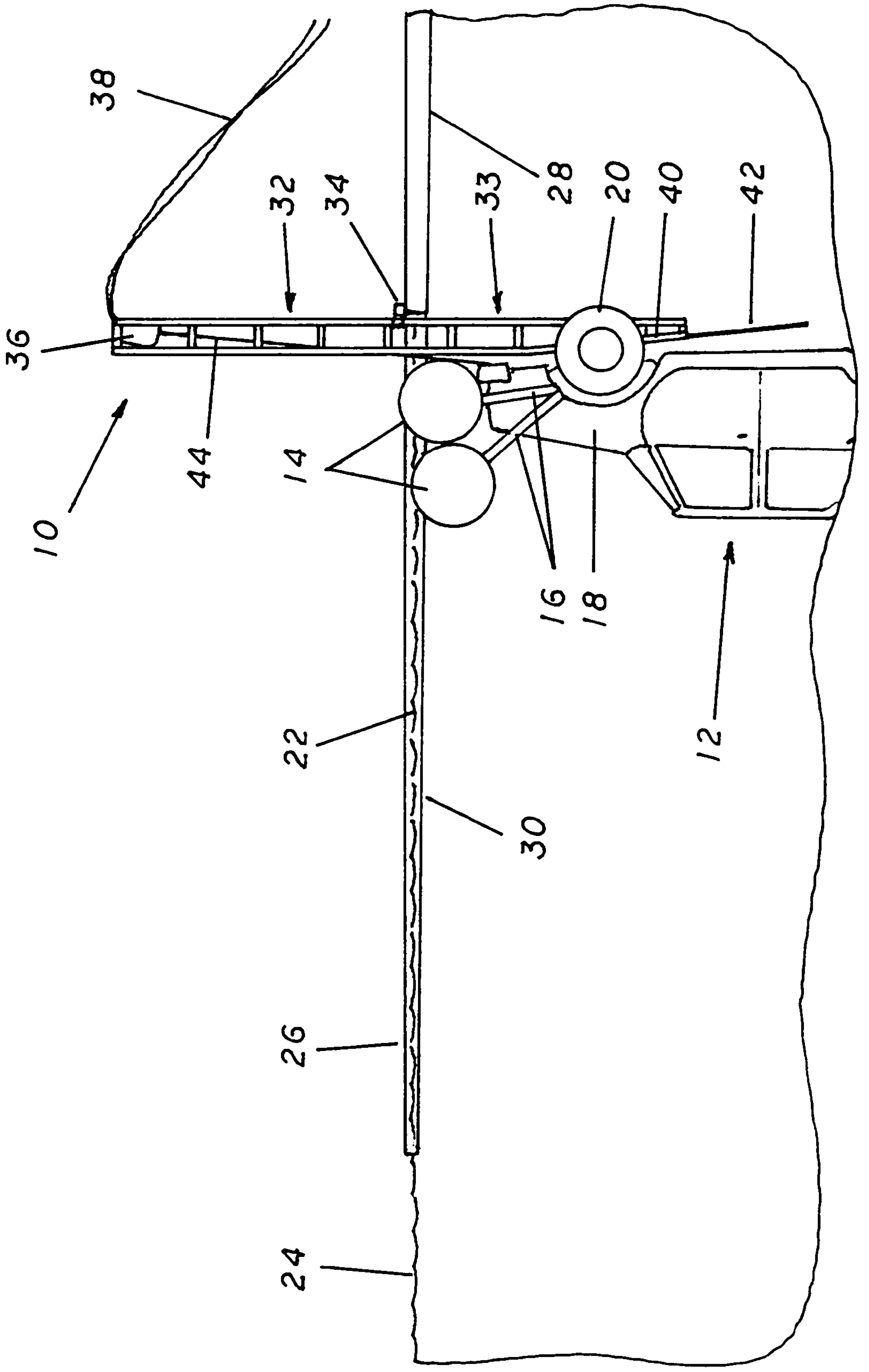
FIG. 2 is a side elevation view of the present invention illustrating the orientation of the vehicle just prior to its being removed from the water.

Referring now to the drawings, and more specifically to FIGS. 1, 2, 3, 4, and 5, the present invention comprises a method of retrieving a vehicle 12 that has become submerged within a body of water such as a river or lake. An important component of the retrieval system is the submerged vehicle extractor 10 which facilitates the actual removal of the vehicle 12 from the water and transfers it to the upper surface of the safe ice 28 upon which the system rests.

The submerged vehicle extractor 10 is an apparatus that is specially designed and built for the retrieval of such vehicles 12 and which has the general configuration of an elongated rectangular frame made up of square steel tubing. The body of the submerged vehicle extractor 10 is made up of two halves, the rearward extractor body 32 and the forward extractor body 33, which are joined together to form the complete body of the submerged vehicle extractor 10. This ability of the submerged vehicle extractor 10 to be broken down into two smaller pieces allows it to be transported easier without the need for specialty transport vehicles and also allows it to be stored more efficiently as it requires less floor space to fully accommodate it.

The submerged vehicle extractor 10 is also designed so that it can be pivoted to lower the front most portion of the forward extractor body 33 into the water during the vehicle 12 removal process. Since it is this portion of the submerged vehicle extractor 10 that is used to initially engage the vehicle 12, this pivotal nature is critical to its operation. Additionally, the front end of the forward extractor body 33 is equipped with a pair of extension guide bars 42. The extension guide bars 42 extend out beyond the most forward end of the submerged vehicle extractor 10 and help to guide the vehicle 12 into the proper position during the extraction process.

The pivoting action is facilitated by the anchor/pivot bar 34 which is the component of the submerged vehicle extractor 10 that actually engages the upper surface of the safe ice 28 to maintain it in the proper location during operations. The anchor/pivot bar 34 also provides the point at which the body of the submerged vehicle extractor 10 pivots around allowing it to engage the vehicle 12 during the removal operations. Finally, the rear portion of the submerged vehicle extractor 10 also provides the point of attachment for the winch 36 which effectively pulls the vehicle 12 from the water by the use of the winch cable 44. The winch 36 is typically supplied with power through winch power feed lines 38 which can supply either electric or hydraulic power depending on the type of winch 36 being used.

The vehicle 12 extraction process is begun by a diver entering the open water 24 and locating the exact position of the submerged vehicle 12. Once the vehicle's position has been confirmed, this information is relayed to the surface crew who begin to cut a vehicle channel 30 through the thin ice 26. The purpose of this is to provide an open vehicle channel 30 to an area of safe ice 28 so that the vehicle 12 can be safely removed from the water and placed on the surface of the ice. The vehicle channel 30 is typically cut with the use of chain saws powered either by gas or hydraulic pressure.

As the vehicle channel 30 is being opened up, the diver returns to attach the floatation bags 14 to the car body 18. This attachment is accomplished by the use of a plurality of bag straps 16 that fit around the car body 18 and allow the body of the floatation bags 14 to float freely above the vehicle 12. Once this has been accomplished, the floatation bags 14 are filled with compressed air (from a source on the surface of the ice) and begin to apply upward pressure on the vehicle 12. When this upward pressure exceeds the buoyance of the vehicle 12 it will then float to the surface. With the vehicle 12 at or just below the water surface 22 it is then aligned with the vehicle channel 30 and moved towards the submerged vehicle extractor 10 located on the edge of the safe ice 28. With the vehicle 12 safely within the vehicle channel 30, the winch cable 44 can then be attached to draw it to the submerged vehicle extractor 10.

Once the vehicle 12 is in position to be extracted from the water, its orientation can be adjusted to best facilitate its removal. Typically, this procedure involves the relocation of one or more of the floatation bags 14 so that the vehicle 12 will obtain a vertical orientation that is then matched by pivoting the submerged vehicle extractor 10 into a mimicking vertical position (illustrated in FIG. 2). With this accomplished, the lower surface, or frame, of the car body 18 engage the forward components of the forward extractor body 33, those being the diagonally oriented extension guide bars 42 and extractor incline 40. These two components of the forward extractor body 33 help to guide the car body 18 up onto the primary portion of the submerged vehicle extractor 10 which is designed to carry and support the vehicle 12 throughout the extraction process. Finally, with the vehicle 12 thus positioned, the winch 36 is employed to begin pulling it from the water as illustrated in FIG. 3.

Once the vehicle 12 has been pulled far enough up the submerged vehicle extractor 10 so that the center of its mass is roughly past the anchor/pivot bar 34, the submerged vehicle extractor 10 and the attached vehicle 12 can then be pivoted to the horizontal position as illustrated in FIG. 4. This pivoting action completes the removal of the vehicle 12 from the water and can easily be accomplished by two or three of the surface workers. With this accomplished, the vehicle 12 is then simply pushed forward in relation to the submerged vehicle extractor 10 until the car wheels 20 make sufficient contact with the surface of the safe ice 28 to roll the vehicle 12 away and remove it completely from the frozen surface of the lake or river.

An important design feature of the present invention that comes into play at this time of the operation is further illustrated in FIG. 15 which details the orientation of the present invention in relation to the downwardly protruding components of the vehicle 12 such as its differential 98, rear axle 100, and exhaust system 102. The U-shaped design of the present invention being composed of horizontally oriented body cross members 54, the rail horizontal members 50, and (in the illustrated case) the forward extractor bodies 33 ensures that the relevant components of the present invention engage the lower surfaces of the rear axle 100 during the extraction process. This manner of engagement elevates the vehicle 12 in a manner so that the downward protruding differential 98 and exhaust system 102 are maintained in a manner so that they have no chance of coming into contact with the present invention or surface of the ice thereby eliminating both a source of damage to the vehicle 12 and the potential for these components to become snagged, inhibiting the extraction process. Additionally, this FIGURE also illustrates the manner in which this design feature of the present invention elevates the car wheels 20 which also aids in the removal of the vehicle 12.

As previously stated, the submerged vehicle extractor 10 is made up of the rearward extractor body 32 and the forward extractor body 33, the configuration of which are best illustrated in FIGS. 6 and 7. Each of these are formed by the positioning of a pair of vertically oriented rearward side rails 46 which are spanned on the lower end by a plurality of body cross members 54. This configuration forms a flattened U-shape in cross-section which is carried throughout the submerged vehicle extractor 10. Similarly, the forward extractor body 33 is formed with the same configuration of forward side rails 48 and body cross members 54. Additionally, the rearward and forward side rails, 46 and 48, are formed by the tying of two rail horizontal members 50 together with a plurality of rail vertical members 52. Finally, the front section of the forward side rails 48 are capped off by the front cross member 56 and are also altered to form the extractor incline 40 which has the purpose of aiding the engagement of the vehicle 12 during the extraction operation as described above.

The rearward extractor body 32 provides the point of positioning for the winch mount 64 employed to attach the winch 36 to the submerged vehicle extractor 10. The winch mount 64 is made up of the winch mount cross member 70 which spans the width of the rearward extractor body 32 near the upper ends of the rearward side rails 46. The winch mount cross member 70 then has a pair of winch mount bars 72 that extend rearward in a parallel manner, both in reference to themselves and to the rearward side rails 46, to attach to the rear cross member 58 which closes off the rearward extractor body 32. The forward surface of the rear cross member 58 also provides the mounting point for the eye-hook 68 which provides a mechanism by which the supplemental but necessary components such as the winch 36 can be attached to the submerged vehicle extractor 10. Finally, the winch mount 64 also contains a pair of diagonal braces 74 which strengthen the load bearing components of the rearward extractor body 32.

The rearward and forward extractor bodies, 32 and 33, are joined together at the extractor body junction 62 located at the approximate center of the submerged vehicle extractor 10 and which is further detailed in FIG. 9. The connection of these components is accomplished by tying the adjoining components of each together through the use of a plurality of bolts 84, washers 86, and nuts 88. The adjoining cross members of the rearward and forward extractor bodies, 32 and 33, are, for the purposes of this description, referred to as the rearward and forward junction cross members, 76 and 78. Additionally, the adjoining rail vertical members 52 are referred to as the rearward junction vertical members 80 and the forward junction vertical members 82. The bolts 84, washers 86, and nuts 88 described above are passed through these components during the assembly process to join the rearward and forward extractor bodies together to form the submerged vehicle extractor 10. Additionally, a pair of guide rods 81 are employed in this process which fit within the adjoining ends of the relevant rail horizontal members 50 to ensure that the two pieces match perfectly during the joining process to ensure the integrity of the whole when stressed during extraction operations.

The method by which the extension guide bars 42 are attached to the front of the forward extractor body 33 is further detailed in FIG. 8. The extension guide bars 42 are slid into the interior of the rail horizontal members 50 that form the upper surface of the forward side rails 48 in the portion that is diagonally configured to form the extractor incline 40. This placement of the extension guide bars 42 means that they will continue the diagonal orientation extractor incline 40 (that is tending diagonally towards the lower surface of the apparatus) which aids in their general purpose of guiding the vehicle 12 up onto the top of the submerged vehicle extractor 10 during the extraction process. The extension guide bars 42 are maintained in the desired position by the use of the guide bar pins 66 which pass through the rail horizontal members 50 of the forward side rails 48 and through the extension guide bars 42 thereby locking them in place. The removal or adjustment of the position of the extension guide bars 42 is accomplished by removing the guide bar pins 66 and sliding the extension guide bars 42 out or into the desired location.

An additional feature of the anchor/pivot bar 34 is further detailed in FIG. 10 and which consists of a pair of anchor/pivot bar extensions 90. The anchor/pivot bar extensions 90 are simply an additional section of the material from which the anchor/pivot bar 34 is fashioned but of a slightly smaller outside diameter. This smaller diameter allows them to be slid inside of the anchor/pivot bar 34 for storage when not needed. However, in some situations the positioning of the submerged vehicle extractor 10 requires a more stable platform than can be provided by simply the anchor/pivot bar 34. In this situation, the anchor/pivot bar extensions 90 can be deployed to broaden the anchor/pivot bar's 34 footprint which in turn provides the desired stability. The anchor/pivot bar extensions 90 are held in the desired position by the use of a pair of extension pins 92 that function in a similar fashion as described above for the guide bar pins 66.

The configuration of the winch mount 64 and the related components are further illustrated in FIGS. 11 and 12 which also detail the use of a common snatch block 94 employed to increase the pulling power of the winch 36. The winch 36 is mounted within the winch mount 64 (the construction of which was detailed above) in a position so that the winch cable 44 extends down the length of the submerged vehicle extractor 10. It then engages the snatch block 94 which is simply a pulley system which doubles the force exerted by the winch cable 44. This is accomplished by reversing the direction of the winch cable 44 on the pulley of the snatch block 94 and securing its end to the eye-hook 68. Thus, as the winch wraps up the winch cable 44 it effectively draws the snatch block 94 towards the winch 36. The snatch block 94 in turn has a snatch block cable 96 which extends forward and which is actually the component attached to the vehicle 12 during the extraction process. The use of the pulley of the snatch block 94 effectively doubles the force generated by the winch 36 and applied to the vehicle 12 which lessens the load placed on the winch thereby extending its usable life and lessening the overall cost of operations to the owner.

Finally, the manner by which the anchor/pivot bar 34 is attached to the rail horizontal member 50 of the submerged vehicle extractor 10 is further detailed in FIGS. 13 and 14. The upper surface of the anchor/pivot bar 34 is equipped with two pairs of vertically oriented pivot bar mounts 60 which are made up of two parallel plates configured to fit snugly on either side of the rail horizontal member 50. Additionally, the two plates that make up the pivot bar mounts 60 extend upwards to the point that they pass beyond the upper edge of the rail horizontal member 50. This allows for the use of the pivot mount pins 61 which serve to hold the rail horizontal members 50 within the pivot bar mounts 60. This method of securement allows the anchor/pivot bar 34 to alter its position relative to the rail horizontal member 50 during the extraction operation. This allows the pivot bar mount 60 to slide along the rail horizontal members 50 (within the confines of adjacent rail vertical members 52) thereby allowing for the alteration of the center of mass relative to the anchor/pivot bar 34.

The use of the pivot bar mount 60 and its slidable nature simplifies the vehicle 12 removal process as it provides a mechanism by which the majority of the involved mass can be moved above the pivot point while maintaining an overall stable configuration. Once this has been accomplished, the greater weight above the pivot point can be easily manipulated to raise the remainder of the vehicle 12 out of the water and bring it into a horizontal orientation from which it can be easily removed from the submerged vehicle extractor 10 and onto the surface of the frozen body of water to complete the operation.

Although the present invention has been described in considerable detail with reference to certain preferred versions thereof, other versions are possible. Therefore, the spirit and scope of the appended claims should not be limited to the description of the preferred versions contained herein.

What is claimed:

1. A submerged vehicle extractor for removing wheeled vehicles from ice covered waters, said submerged vehicle extractor comprising:

a U shaped elongate extractor frame having a length and a width wherein said length is greater than said width and said width is spaced such that said width is less than the width of said submerged vehicle so that said U shaped elongate extractor frame fits between the wheels of said wheeled vehicle, said U shaped elongate extractor frame having a left and right elongate lower horizontal frame member having a rearward portion and a forward portion, a left and right elongate upper horizontal frame member having a rearward portion and a forward portion, a plurality of rail vertical members extending perpendicularly upward from said lower horizontal frame members and fixedly connecting to said upper horizontal frame members and a plurality of body cross member extending perpendicularly sideways from said left lower horizontal frame member to said right lower horizontal frame member, said left and right elongate upper and lower horizontal frame members and said vertical members and said body cross members forming said U shaped elongate extractor frame having an open center portion such that said upper left and right horizontal frame members are the upper portion of the U shaped elongate extractor frame and said left and right elongate lower horizontal frame members are the lower portion of said U shaped elongate extractor frame;

an anchor/pivot bar having a length spanning said width of said U shaped elongate extractor frame said anchor/pivot bar having a lower flat surface and an upper surface said upper surface having a left first and second pivot bar mount extending upward from said upper surface removably attached to said left elongate lower horizontal frame member and a right first and second pivot bar mount extending upward from said upper surface removably attached to said right elongate lower horizontal frame member;

a powered winch attached to said rearward portion of said elongate extractor frame wherein said powered winch is centered between and within said left and right lower horizontal frame members and fixedly attached to one of said body cross members below said left and right horizontal frame members; and a first and second elongate power feed line attached to said powered winch.

2. A submerged vehicle extractor for removing wheeled vehicles from ice covered waters as in claim 1 wherein said left first and second pivot bar mount and said right first and second pivot bar mount have a left and right pivot pin such that said pivot bar mounts may be slidably attached to said left and right elongate lower horizontal frame members and slide fore and aft between said vertical frame members.

3. A submerged vehicle extractor for removing wheeled vehicles from ice covered waters as in claim 2 further comprising at least one anchor/pivot bar extension removably attached to said anchor/pivot bar such that the length of said anchor/pivot bar is greater than the width of said elongate extractor frame.

4. A submerged vehicle extractor for removing wheeled vehicles from ice covered waters as in claim 3 wherein said forward and rearward portions may be detached for transport.

5. A submerged vehicle extractor for removing wheeled vehicles from ice covered waters as in claim 4 further comprising removable extension guide bars extending outward from said extractor incline, said extension guide bars extending forward beyond said elongate lower horizontal frame members.

6. A submerged vehicle extractor for removing wheeled vehicles from ice covered waters, said submerged vehicle extractor comprising:

an elongate U shaped extractor frame having a length and a width wherein said length is greater than said width and said width is spaced such that said width is less than the width of said submerged vehicle so that said U shaped elongate extractor frame fits between the wheels of said wheeled vehicle, said U shaped elongate extractor frame having a left and right elongate lower horizontal frame member having a rearward portion and a forward portion, a left and right elongate upper horizontal frame member having a rearward portion and a forward portion said forward portion forming an extractor incline such that said forward portion inclines toward said lower horizontal frame members, a plurality of rail vertical members extending perpendicularly upward from said lower horizontal frame members and fixedly connecting to said upper horizontal frame members and a plurality of body cross member extending perpendicularly sideways from said left lower horizontal frame member to said right lower horizontal frame member, said left and right elongate upper and lower horizontal frame members and said vertical members and said body cross members forming said U shaped elongate extractor frame having an open center portion such that said upper left and right horizontal frame members are the upper portion of the U shaped elongate extractor frame and said left and right elongate lower horizontal frame members are the lower portion of said U shaped elongate extractor frame;

an anchor/pivot bar having a lower flat ice engaging surface, said an anchor/pivot bar having a length substantially greater than said width of said U shaped elongate extractor frame, said anchor/pivot bar having an upper surface, said upper surface having a left first and second pivot bar mount extending upward from said upper surface and a right first and second pivot bar mount extending upward from said upper surface, wherein said anchor/pivot bar is not part of a wheeled trailer or boat lift;

a left and right pivot pin between said left first and second pivot bar mount and said right first and second pivot bar mount such that said pivot bar mounts may be slidably attached to said left and right elongate lower horizontal frame members and slide fore and aft between said vertical frame members;

a powered winch attached to said rearward portion of said elongate extractor frame wherein said powered winch is centered between and within said left and right lower horizontal frame members and fixedly attached to one of said body cross members below said left and right horizontal frame members; and a first and second elongate power feed line attached to said powered winch.

7. A submerged vehicle extractor for removing wheeled vehicles from ice covered waters as in claim 6 further comprising removable extension guide bars extending outward from said extractor incline, said extension guide bars extending forward beyond said elongate lower horizontal frame members.

8. A submerged vehicle extractor for removing wheeled vehicles from ice covered waters as in claim 7 further comprising at least one anchor/pivot bar extension removably attached to said anchor/pivot bar said anchor/pivot bar extension being slidably stored within said anchor pivot bar.

9. A submerged vehicle extractor for removing wheeled vehicles from ice covered waters as in claim 8 wherein said forward and rearward portions may be detached for transport.

10. A method for extracting a sunken wheeled vehicle from ice covered waters comprising the steps of:

supplying a U shaped elongate extractor frame having a length and a width wherein said length is greater than said width and said width is spaced such that said width is less than the width of said submersed vehicle so that said U shaped elongate extractor frame fits between the wheels of said wheeled vehicle, said U shaped elongate extractor frame having a left and right elongate lower horizontal frame member having a rearward portion and a forward portion, a left and right elongate upper horizontal frame member having a rearward portion and a forward portion said forward portion forming an extractor incline such that said forward portion inclines toward said lower horizontal frame members, a plurality of rail vertical members extending perpendicularly upward from said lower horizontal frame members and fixedly connecting to said upper horizontal frame members and a plurality of body cross member extending perpendicularly sideways from said left lower horizontal frame member to said right lower horizontal frame member, said left and right elongate upper and lower horizontal frame members and said vertical members and said body cross members forming said U shaped elongate extractor frame having an open center portion such that said upper left and right horizontal frame members are the upper portion of the U shaped elongate extractor frame and said left and right elongate lower horizontal frame members are the lower portion of said U shaped elongate extractor frame, said U shaped elongate extractor frame also having a powered winch attached to said rearward portion of said elongate extractor frame wherein said powered winch is centered between and within said left and right lower horizontal frame members and fixedly attached to one of said body cross members below said left and right horizontal frame members, said winch having a first and second elongate power feed line attached to said powered winch;

attaching an anchor/pivot bar having a length spanning said width of said U shaped elongate extractor frame said anchor/pivot bar having a lower flat ice engaging surface and an upper surface said upper surface having a left first and second pivot bar mount extending upward from said upper surface removably attached to said left elongate lower horizontal frame member and a right first and second pivot bar mount extending upward from said upper surface removably attached to said right elongate lower horizontal frame member to said U shaped elongate extractor frame, wherein said anchor/pivot bar is not part of a wheeled trailer or boat lift;

placing said elongate U shaped extractor frame on said ice covered waters next to a section of open water;

pivoting said elongate U shaped extractor frame about said anchor/pivot bar such that said vehicle engaging portion is under water;

attaching a sunken vehicle to the winch section of said extractor;

winching said vehicle up said elongate extractor frame until said vehicles weight is over said anchor/pivot bar; and pivoting said elongate extractor frame with said attached vehicle into a position such that extractor frame is parallel to said ice.

11. A method for extracting a sunken wheeled vehicle from ice covered waters as in claim 10 further comprising the step of first opening ice as necessary so as to create a place for said elongate extractor on ice covered waters next to a section of open water.

12. A method for extracting a sunken wheeled vehicle from ice covered waters as in claim 11 further comprising the step of moving the vehicle off of the ice covered waters.

13. A method for extracting a sunken wheeled vehicle from ice covered waters as in claim 12 further comprising the step of detaching said forward and rearward sections for transport.

* * * * *